US011582802B2

(12) United States Patent
Höglund et al.

(10) Patent No.: US 11,582,802 B2
(45) Date of Patent: Feb. 14, 2023

(54) PARTITIONING OF RANDOM ACCESS PREAMBLES

(71) Applicant: Telefonaktiebolaget LM Ericsson (publ), Stockholm (SE)

(72) Inventors: Andreas Höglund, Solna (SE); Olof Liberg, Stockholm (SE); Tuomas Tirronen, Helsinki (FI)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 9 days.

(21) Appl. No.: 16/611,511

(22) PCT Filed: May 15, 2018

(86) PCT No.: PCT/EP2018/062632
§ 371 (c)(1),
(2) Date: Nov. 7, 2019

(87) PCT Pub. No.: WO2018/210890
PCT Pub. Date: Nov. 22, 2018

(65) Prior Publication Data
US 2020/0245362 A1     Jul. 30, 2020

Related U.S. Application Data

(60) Provisional application No. 62/506,541, filed on May 15, 2017.

(51) Int. Cl.
*H04W 74/08*     (2009.01)
*H04W 76/27*     (2018.01)
(Continued)

(52) U.S. Cl.
CPC ......... *H04W 74/0833* (2013.01); *H04W 8/24* (2013.01); *H04W 72/14* (2013.01); *H04W 76/27* (2018.02)

(58) Field of Classification Search
CPC ... H04W 74/0833; H04W 76/27; H04W 8/24; H04W 72/14
See application file for complete search history.

(56) References Cited

U.S. PATENT DOCUMENTS

2012/0147830 A1*  6/2012  Lohr ............... H04L 1/1854
                                                   370/329
2014/0126460 A1*  5/2014  Bienas ............ H04W 74/002
                                                   370/315
(Continued)

OTHER PUBLICATIONS

3rd Generation Partnership Project, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 14)", Technical Specification, 3GPP TS 36.300 V14.2.0, Mar. 1, 2017, pp. 1-330, 3GPP.
(Continued)

*Primary Examiner* — Brenda H Pham
(74) *Attorney, Agent, or Firm* — Christopher & Weisberg, P.A.

(57) ABSTRACT

The invention refers to a method at a user equipment for performing a random access procedure, wherein the UE randomly selects a random access preamble from a given set of preambles to be used for the random access procedure, the method comprising the steps of detecting (420) a partitioning of the given set of random access preambles into a first and a second partition, detecting (430) a certain capability of the UE, and selecting (440) a random access preamble from the fist partition to indicate the certain capability to a base station; the invention further refers to a corresponding method in a base station, a corresponding UE, and a corresponding base station.

19 Claims, 13 Drawing Sheets

(51) Int. Cl.
*H04W 8/24* (2009.01)
*H04W 72/14* (2009.01)

(56) References Cited

U.S. PATENT DOCUMENTS

| | | | | |
|---|---|---|---|---|
| 2014/0293902 A1* | 10/2014 | Hegde | ............... | H04W 74/085 370/329 |
| 2015/0092711 A1* | 4/2015 | Tabet | ............... | H04L 1/0045 370/329 |
| 2015/0365976 A1* | 12/2015 | Lee | ............... | H04W 4/70 455/422.1 |
| 2016/0255616 A1* | 9/2016 | Martin | ............... | H04W 72/048 370/330 |

OTHER PUBLICATIONS

3rd Generation Partnership Project, "3rd Generation Partnership Project; Technical Specification Group Radio Access Network; Evolved Universal Terrestrial Radio Access (E-UTRA); Radio Resource Control (RRC); Protocol Specification (Release 14)", Technical Specification, 3GPP TS 36.331 V14.2.0, Mar. 1, 2017, pp. 1-721, 3GPP.

3rd Generation Partnership Project, "3rd Generation Partnership Project; Technical Specification Group Radio Access Network; Evolved Universal Terrestrial Radio Access (E-UTRA); Medium Access Control (MAC) Protocol Specification (Release 14)", Technical Specification, 3GPP TS 36.321 V14.2.0, Mar. 1, 2017, pp. 1-106, 3GPP.

3rd Generation Partnership Project, "3rd Generation Partnership Project; Technical Specification Group Radio Access Network; Evolved Universal Terrestrial Radio Access (E-UTRA); Physical Layer Procedures (Release 14)", Technical Specification, 3GPP TS 36.213 V14.2.0, Mar. 1, 2017, pp. 1-454, 3GPP.

Ericsson, "Early Data Transmission for LTE-MTC", 3GPP TSG-RAN WG1 #89s, Hangzhou, China, May 15, 2017, pp. 1-9, R1-1706886, 3GPP.

Ercisson, "Early Data Transmission for NB-IoT", 3GPP TSG-RAN WG1 #89s, Hangzhou, China, May 15, 2017, pp. 1-8, R1-1706895, 3GPP.

Ericsson, "Random Access in NR", 3GPP TSG-RAN WG2 #98, Hangzhou, China, May 15, 2017, pp. 1-5, R2-1704403, 3GPP.

* cited by examiner

PARTITIONING OF RANDOM ACCESS PREAMBLES

TECHNICAL FIELD

The present disclosure generally relates to wireless communication systems, and specifically relates to techniques for a partitioning of random access preambles, e.g. for early data transmission/reception.

BACKGROUND

There has been a lot of work in 3GPP lately on specifying technologies to cover Machine-to-Machine (M2M) and/or Internet of Things (IoT) related use cases. Most recent work for 3GPP Release 13 and 14 includes enhancements to support Machine-Type Communications (MTC) with new UE categories (Cat-M1, Cat-M2), supporting reduced bandwidth of 6 physical resource blocks (PRBs) (up to 24 PRBs for Cat-M2), and Narrowband IoT (NB-IoT) UEs providing a new radio interface (and UE categories, Cat-NB1 and Cat-NB2).

The present disclosure refers to the LTE enhancements introduced in 3GPP Release 13,14 and 15 for MTC as "eMTC", including (not limiting) support for bandwidth limited UEs, Cat-M1, and support for coverage enhancements. This is to separate discussion from NB-IoT (notation here used for any Release), although the supported features are similar on a general level.

There are multiple differences between "legacy" LTE and the procedures and channels defined for eMTC (likewise for NB-IoT). Some important differences include new physical channels, such as the physical downlink control channels, called MPDCCH in eMTC, NPDCCH in NB-IoT, and a new physical random access channel, NPRACH, for NB-IoT.

For 3GPP Release 15, new work items, WIs, have been established, such as WI "even further enhanced MTC for LTE, LTE_efeMTC," [WI_eMTC] and "further NB-IoT enhancements, NB_IOTfenh," [WI_NBIOT] that target eMTC and NB-IoT enhancements, respectively. Both these WIs seek to reduce UE power consumption and latency through introducing a possibility to send data as early as possible during the random access procedure. For example, a new work item (WI) entitled "Even further enhanced MTC for LTE (LTE_efeMTC)" (hereinafter, "WI_eMTC") aims to address this goal with respect to eMTC enhancements. WI_eMTC provides as follows:

Support early data transmission: Evaluate power consumption/latency gain and specify necessary support for DL/UL data transmission on a dedicated resource during the random access procedure (after PRACH transmission and before the RRC connection setup is completed) at least in the RRC Suspend/Resume case.

As another example, a new work item entitled "Further NB-IoT enhancements (NB_IOTfenh)" (hereinafter, "WI_NBIOT") aims to address this goal with respect to NB-IoT enhancements. WI_NBIOT provides as follows:

Evaluate power consumption/latency gain and specify necessary support for DL/UL data transmission on a dedicated resource during the random access procedure after NPRACH transmission and before the RRC connection setup is completed.

As used herein, such a feature, where data can be sent during random access procedure, shall be referred to as "early data" feature, meaning that data can be sent earlier when compared to current LTE specifications (that is, after RRC connection setup or resume has been completed).

Currently specified random access and connection control procedures can be found in the following 3GPP Technical Specifications (TS): 3GPP TS 36.321, "MAC protocol specification", v14.2.0, March 2017 and 3GPP TS 36.331, "RRC protocol specification"; v14.2.0, March 2017. The contention based random access (RA) procedure can be found in 3GPP TS 36.300, "E-UTRA and E-UTRAN; Overall description; Stage 2", v14.2.0, March 2017. This procedure is illustrated in FIG. 1 of the present disclosure. The suite of messages in FIG. 1 are commonly referred to as message 1 (msg1) through message 4 (msg4).

Therein, the UE transmits a first message, msg1, comprising a random access preamble to the eNB, wherein this preamble has been selected out of a given or pre-defined set of preambles. The eNB sends a second message, msg 2, comprising a random access response to the UE. Based on msg2, UE sends a third message, msg 3, as scheduled transmission to the eNB. The fourth message, msg4, is sent from the eNB to the UE, in order to resolve a potential contention (due to the fact that two or more UEs have selected the same random access preamble).

The structure of medium access control (MAC) layer protocol data units (PDUs) are defined in 3GPP TS 36.321, "Physical layer procedures", v14, and are also referenced to herein. The structure of the grant included in the MAC random access response (RAR) is defined in TS36.213.

Currently, in LTE, it is not possible to send uplink or downlink data before the contention-based random access procedure has been completed—that is, not before message 4 has been transmitted by the eNB and successfully received by the UE.

SUMMARY

Embodiments refer to features where data can be sent during random Access procedure as "early data" features, meaning that data can be sent earlier when compared to current LTE specifications (that is, after RRC connection setup or resume has been completed).

As the random access procedure is the method for the UE to get dedicated network resources and make its identity known to the network or eNB, the eNB does in general not know the exact UE identity until after contention has been resolved. Since the UE identity is not known to the eNB before contention resolution, typically also the capabilities of the UE are not known to the network/eNB.

Thus, a method for sending early data cannot rely on that the eNB knows the particular UE that has initiated the random access procedure and whether the UE supports early data transmission or not. Further, UEs not supporting this feature, e.g. UEs according to Release 13 and 14, are not able to comprehend new formats only defined in later releases (e.g. Release 15); therefore, the messages during the random access procedure can only be changed in a backwards-compatible manner. This limits the possibility to introduce new messages and procedures for support of early data transmission.

An embodiment refers to a method in user equipment for performing a random access procedure, wherein the UE randomly selects a random access preamble from a given set of preambles to be used for the random access procedure, the method comprising:

detecting a partitioning of the given set of random access preambles into a first and a second partition, detecting a certain capability of the UE, and selecting a random access preamble from the fist partition to indicate the certain capability to the eNB.

A further embodiment refers to a user equipment adapted to perform the steps of:
  detecting a partitioning of the given set of random access preambles into a first and a second partition,
  detecting a certain capability of the UE, and
  selecting a random access preamble from the fist partition to indicate the certain capability to the eNB.

A further embodiment refers to a user equipment configured to communicate with a base station, the UE comprising a radio interface and processing circuitry, and adapted to perform the steps of:
  detecting a partitioning of the given set of random access preambles into a first and a second partition,
  detecting a certain capability of the UE, and
  selecting a random access preamble from the fist partition to indicate the certain capability to the eNB.

A further embodiment refers to a method at a base station for performing a random access procedure, wherein a UE randomly selects a random access preamble from a given set of preambles to be used for the random access procedure, the method comprising:
  providing an indication of a partitioning of the given set of random access preambles into a first and a second partition,
  receiving from the UE a message indicative of a selected random access preamble, and
  detecting a certain capability of the UE by detecting that the selected random access preamble is comprised by the first partition.

A further embodiment refers to a base station or eNB adapted to perform the steps of:
  providing an indication of a partitioning of the given set of random access preambles into a first and a second partition,
  receiving from the UE a message indicative of a selected random access preamble, and
  detecting a certain capability of the UE by detecting that the selected random access preamble is comprised by the first partition.

A further embodiment refers to a base station or eNB configured to communicate with a UE, the base station eNB comprising a radio interface and processing circuitry, the base station or eNB adapted to perform the steps of:
  providing an indication of a partitioning of the given set of random access preambles into a first and a second partition,
  receiving from the UE a message indicative of a selected random access preamble, and
  detecting a certain capability of the UE by detecting that the selected random access preamble is comprised by the first partition.

BRIEF DESCRIPTION

Figure 8:
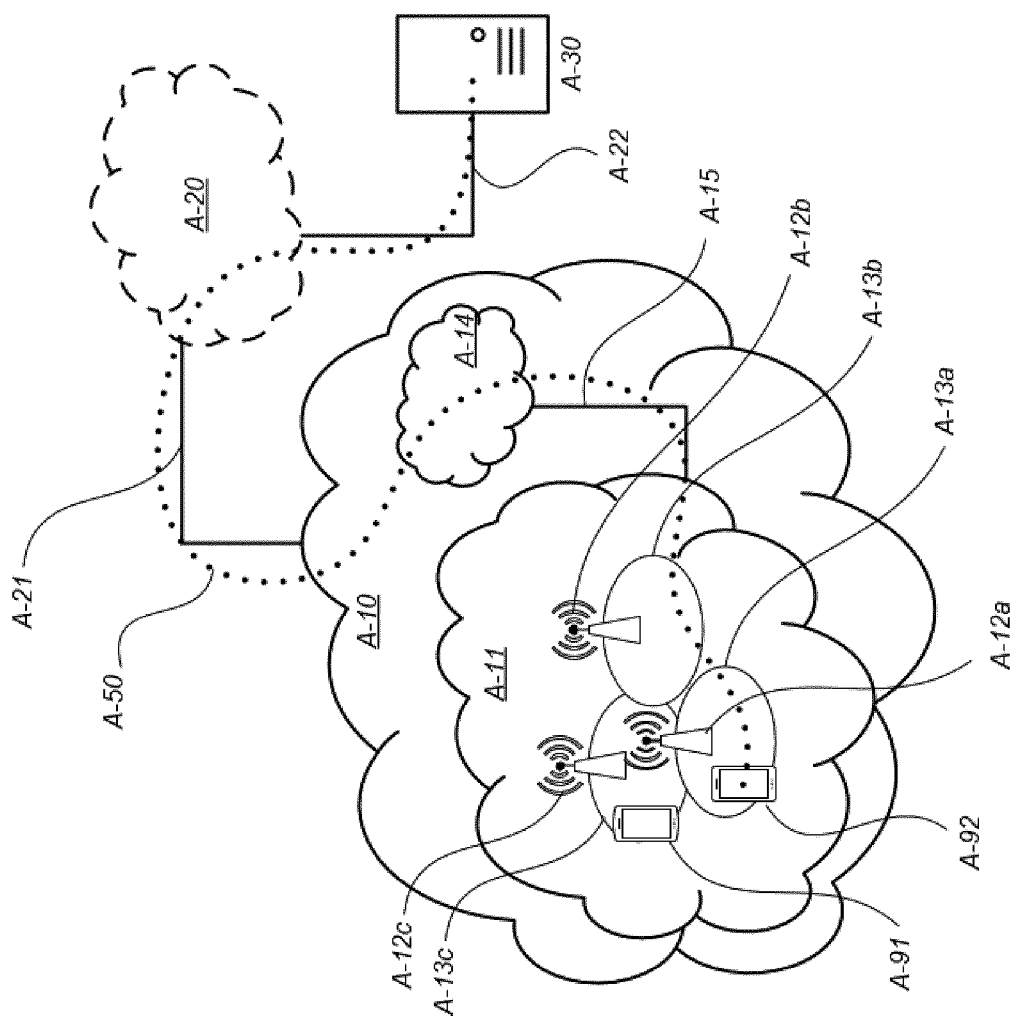

FIG. 8 schematically illustrates a telecommunication network connected via an intermediate network to a host computer.

Figure 9:
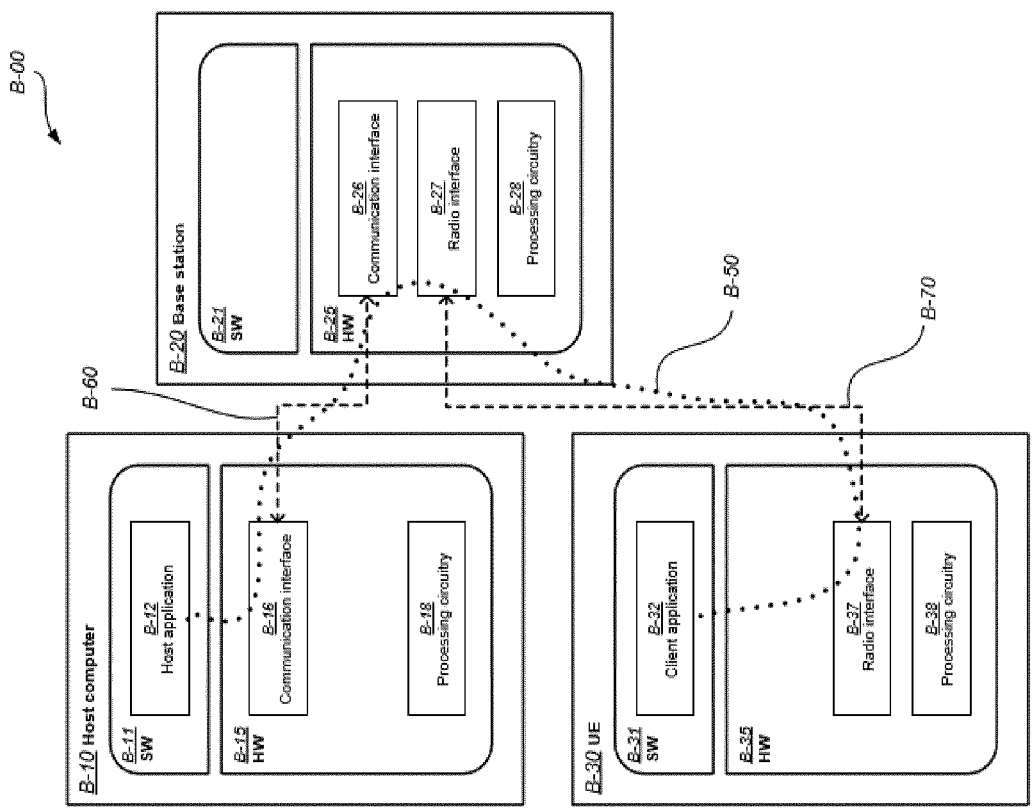

FIG. 9 is a generalized block diagram of a host computer communicating via a base station with a user equipment over a partially wireless connection.

FIGS. 10 to 13 are flowcharts illustrating methods implemented in a communication system including a host computer, a base station and a user equipment.

DETAILED DESCRIPTION

Some of the embodiments contemplated herein will now be described more fully hereinafter with reference to the accompanying drawings. Other embodiments, however, are contained within the scope of this disclosure and the invention should not be construed as limited to only the embodiments set forth herein; rather, these embodiments are provided by way of example to convey the scope of the inventive concept to those skilled in the art.

In LTE, preamble partitioning has been introduced for indicating the UE support for certain features where early capability signaling is important, such as the herein discussed early data transmission feature. Preamble partitioning therein may mean to divide the preamble space (or the set of preambles) into two subspaces or parts.

Hard partitioning as used by LTE may mean that UEs supporting the certain features uses a preamble out of the first part and the other UEs not supporting that feature uses a preamble of the second part. However, such hard partitioning results in a random access capacity reduction.

According to embodiments, to avoid a random access capacity reduction due to trunking losses, UEs having a certain capability (capability X) or supporting a certain feature (feature X) are expected to care about a certain preamble partitioning, whereas the other UEs not having this capability or not supporting this feature shall not care about this preamble partitioning. In other words, UEs having the certain capability (randomly) select a preamble out of a defined part of a set of preambles (also being referred to as virtual part or virtual partitioning), while the other UEs (randomly) select a preamble out of the whole set of preambles. Such partitioning will also be referred to as virtual partitioning in the following.

The virtual partitioning may be regarded as a "soft" capability indication from the UE. That is, at the reception of msg1, the eNB does not know whether the sending UE has the certain capability or not. If the eNB detects a preamble selected from the virtual part(itioning) there is however a larger probability that the UE has that capability. For example, if there are 48 preambles and 12 are used in the virtual partitioning, there is a 25% chance that a non-feature capable UE will select a virtual partitioning preamble, whereas a feature capable UE will always select a preamble from the virtual partitioning preambles. Thus, the eNB can make an assumption of whether the UE supports the certain feature or not.

In an embodiment, the certain capability is an early data communication (transmission or reception) capability; i.e. there are 'early data capable' UEs as e.g. defined in Release 15 (Release 15 UE) and "legacy" UEs not supporting early data communication (Release 13 or Release 14 UEs). If the eNB receives from the UE one of the preambles within the virtual partitioning, there is a quite good probability that the UE is an 'early data capable' UE. Again, if there are 48 preambles and 12 are used in the virtual partitioning, there is a 25% chance that a non-early data capable UE will select a virtual partitioning preamble, whereas an early data capable UE will always select a preamble virtual partitioning preamble (if such selection is used by the UE as a capability indication and not only when the UE wants to actually transmit early data).

This way, backward-compatibility is fully provided, e.g. Release 13 and Release 14 UEs will still select and use all (N)PRACH preambles allocated for system access, whereas new UEs (Release 15) UE only use the preambles in the virtual partitioning. early data transmission (or reception).

The UE identity and hence the UE capabilities are currently unknown to the eNB when it provides the UE with an UL grant for message 3 (msg3) transmission in message 2 (msg2), random Access response (RAR). According to embodiments, to avoid (N)PRACH capacity reduction from reduced trunking gains, UEs that are not capable of early data transmission (or reception), e.g. all Release 13 and Release 14 UEs, will still select and use all preambles, i.e. where preamble partitioning is not used for the early data feature.

Embodiments of the present disclosure provides a technique for "virtual partitioning" of the (N)PRACH resources by broadcasting an indication within the system information (SI), which preambles (or (N)PRACH resources) are used for the early data transmission (or reception) feature. UEs that would like to use the early data feature (i.e. UEs capable of early data transmission or reception) are configured to select (randomly) one of the indicated preambles (or (N)PRACH resources). UEs not capable of early data transmission (or reception) would still select (randomly) any preamble (or (N)PRACH resource) from the full set of preambles.

One benefit of the aspects herein is that the drawbacks of partitioning in terms of trunking losses can be avoided for Release 13 and 14 UEs. By avoiding hard partitioning, there are further benefits on the network side. For instance, the eNB would not have to provide the extra resources or effort for all configured preambles and/or (N)PRACH resources (up to 64 preambles for a PRACH configuration in LTE-M, or up to 48 preambles per NPRACH resource for NB-IoT), and on the UE side it would be clear for which (N)PRACH resources dual grants are provided, given that it is not feasible to provide it for all. All this may result in reduced requirements on the eNB to perform blind decoding, and also in reduced risk of wasted uplink and downlink radio resources due to dual grants.

According to embodiments described above, the eNB (base station, network node, etc.) use a system information message to indicate which set of preambles to use or to support the early data feature, e.g. to receive a double grant in Msg2, or to just receive a larger grant than the minimal normally given to carry just the RRC Connection Request or RRC Resume Request message in msg3.

In an embodiment, preamble partitioning is used for this purpose, that is the preamble space is split in two parts by a configurable divisor.

Abstract Syntax Notation One, ASN.1, is an interface description language for defining data structures broadly used in telecommunications. An ASN.1 example for preamble partitioning for NB-IoT, wherein the preambles correspond to the different starting subcarriers (additions in bold text) is shown below:

NPRACH-ConfigSIB-NB information elements

```
--ASN1START
NPRACH-ConfigSIB-NB-r13 ::=           SEQUENCE {
  nprach-CP-Length-r13                  ENUMERATED {us66dot7, us266dot7},
  rsrp-ThresholdsPrachInfoList-r13      RSRP-ThresholdsNPRACH-InfoList-NB-r13    OPTIONAL,    --
need OR
  nprach-ParametersList-r13             NPRACH-ParametersList-NB-r13
}
NPRACH-ConfigSIB-NB-v1330 ::=         SEQUENCE {
  nprach-ParametersList-v1330             NPRACH-ParametersList-NB-v1330
}
NPRACH-ParametersList-NB-r13 ::=      SEQUENCE (SIZE (1 . . . maxNPRACH-Resources-NB-r13)) OF
NPRACH-Parameters-NB-r13
NPRACH-ParametersList-NB-v1330 ::=    SEQUENCE (SIZE (1 . . . maxNPRACH-Resources-NB-r13)) OF
NPRACH-Parameters-NB-v1330
NPRACH-Parameters-NB-r13::=           SEQUENCE {
  nprach-Periodicity-r13                  ENUMERATED {ms40, ms80, ms160, ms240,
                                              ms320, ms640, ms1280, ms2560},
  nprach-StartTime-r13                    ENUMERATED {ms8, ms16, ms32, ms64,
                                              ms128, ms256, ms512, ms1024},
  nprach-SubcarrierOffset-r13             ENUMERATED {n0, n12, n24, n36, n2, n18, n34,
spare1},
  nprach-NumSubcarriers-r13               ENUMERATED {n12, n24, n36, n48},
  nprach-SubcarrierMSG3-RangeStart-r13    ENUMERATED {zero, oneThird, twoThird, one},
  maxNumPreambleAttemptCE-r13             ENUMERATED {n3, n4, n5, n6, n7, n8, n10, spare1},
  numRepetitionsPerPreambleAttempt-r13    ENUMERATED {n1, n2, n4, n8, n16, n32, n64, n128},
  npdcch-NumRepetitions-RA-r13            ENUMERATED {r1, r2, r4, r8, r16, r32, r64, r128,
                                              r256, r512, r1024, r2048,
                                              spare4, spare3, spare2, spare1},
  npdcch-StartSF-CSS-RA-r13               ENUMERATED {v1dot5, v2, v4, v8, v16, v32, v48,
v64},
  npdcch-Offset-RA-r13                    ENUMERATED {zero, oneEighth, oneFourth,
threeEighth}
  . . . ,
  [[
    nprach-EarlyDataStart-r15             ENUMERATED {zero, oneThird, twoThird, one}
                                              OPTIONAL    --    Need OP
  ]],
  [[
```

-continued

| NPRACH-ConfigSIB-NB information elements | | | |
|---|---|---|---|
| nprach-EarlyData-r15 | ENUMERATED {true} | OPTIONAL | -- Need OR |

```
}]
}
NPRACH-Parameters-NB-v1330 ::=         SEQUENCE {
    nprach-NumCBRA-StartSubcarriers-r13     ENUMERATED {n8, n10, n11, n12, n20, n22, n23, n24,
                                              n32, n34, n35, n36, n40, n44, n46,
n48}
}
RSRP-ThresholdsNPRACH-InfoList-NB-r13 ::=   SEQUENCE (SIZE(1 . . . 2)) OF RSRP-Range
--ASN1STOP
```

The suffixes -r13 and -r15 refer to release 13 and 15 of 3GPP specifications respectively and may be omitted occasionally in the following.

In the information elements, IEs, listed above, nprach-EarlyDataStart-r15 represents the configurable divisor, e.g. being configured with one of the values 0, ⅓, ⅔, 1 as shown above; in an embodiment, this IE may indicate a partition of the contention-based preambles such that subcarriers that are used with the early data feature have the following subcarrier index:

nprach-SubcarrierOffset+[floor(nprach-NumCBRA-
      StartSubcarriers*nprach-EarlyDataStart-r15),
      nprach-NumCBRA-StartSubcarriers-1]

Subcarriers that are not used with the early data feature have subcarrier index:

nprach-SubcarrierOffset+[0, floor(nprach-
      NumCBRA-StartSubcarriers*nprach-EarlyDa-
      taStart-r15)-1]

It may be noted that this example is on purpose overlapping with the Multi-tone capability indication, since early data capable UEs are likely also Multi-tone capable. In other embodiments, only the Multi-tone preambles may be partitioned.

In the above example, only the contention-based preambles are partitioned. Since the use of early data may be of interest also in RRC connected mode or for mobile terminated traffic, in an embodiment, also the set of contention-free preambles is partitioned. In such embodiment, the contention-free preambles/subcarriers used with the early data feature may have subcarrier index:

nprach-SubcarrierOffset+nprach-NumCBRA-Start-
      Subcarriers+[floor((nprach-NumSubcarriers–
      nprach-NumCBRA-StartSubcarriers)*nprach-
      EarlyDataStart-r15), (nprach-NumSubcarriers–
      nprach-NumCBRA-StartSubcarriers)]

and contention-free subcarriers that are not used with the early data feature have subcarrier index:

nprach-SubcarrierOff set+nprach-NumCBRA-Start-
      Subcarriers+[0, floor((nprach-NumSubcarriers–
      nprach-NumCBRA-StartSubcarriers)* nprach-
      EarlyDataStart-r15)-1]

In an embodiment, the NPRACH or PRACH configuration may carry an indication to indicate whether is supports early data or not. This is shown by the configuration parameter nprach-EarlyData in the ASN.1 example shown above (wherein this parameter assumes the value "true", if early data is supported). In this way, many (N)PRACH resources may be configured with only some of them to support early data.

In an alternative, the (N)PRACH configuration may be made non-backwards compatible, such that a Release 13 or a Release 14 UE would not understand it, and hence would not be able to use it. This corresponds to a "hard partitioning" for (N)PRACH, since Release 13 and Release 14 UEs would use only other (N)PRACH resources, while Release 15 UEs with the intention of transmitting (or receiving) early data would use this new type of (N)PRACH resources.

In an embodiment, different preamble partitioning's are used for the (N)PRACH resources associated with different Coverage Enhancement, CE levels.

Coverage enhancement has been introduced to improve coverage to be utilized by some MTC/IoT devices with challenging coverage conditions, for example water/gas/electricity metering devices installed in basements. Thereto, new coverage-enhancement modes have been defined. The coverage enhancement is mainly achieved through repetition techniques. In ordinary 4G operations, each transmission spans just 1 millisecond, but in the CE modes each transmission can be repeated a plurality of times to improve the chances of successful transmission.

Figure 1:
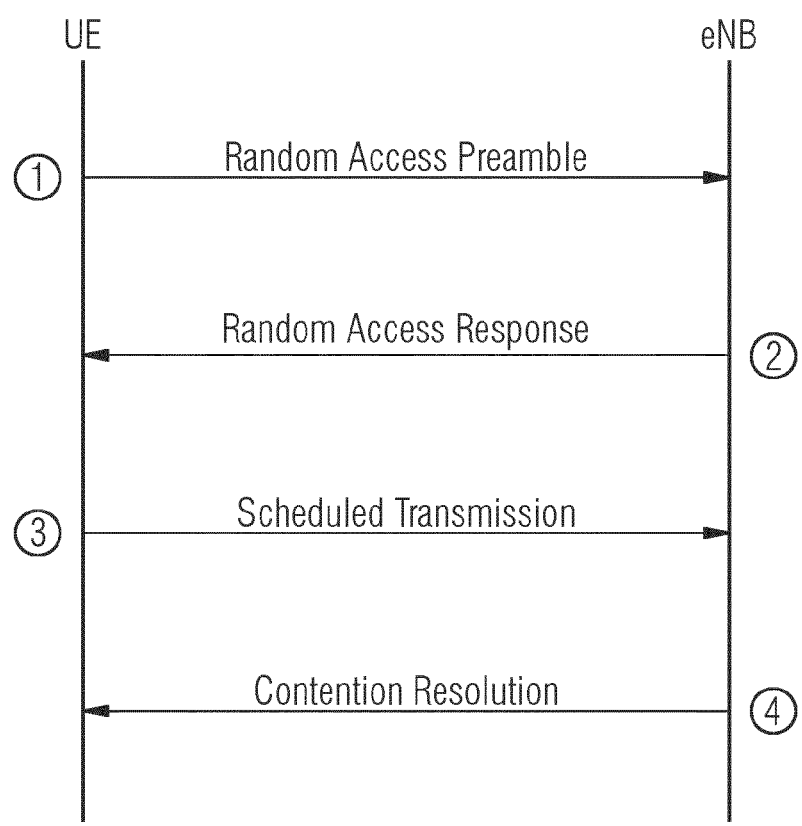
FIG. 1 is a signal flow diagram illustrating an example of a random access procedure according to 3GPP.
Figure 2:
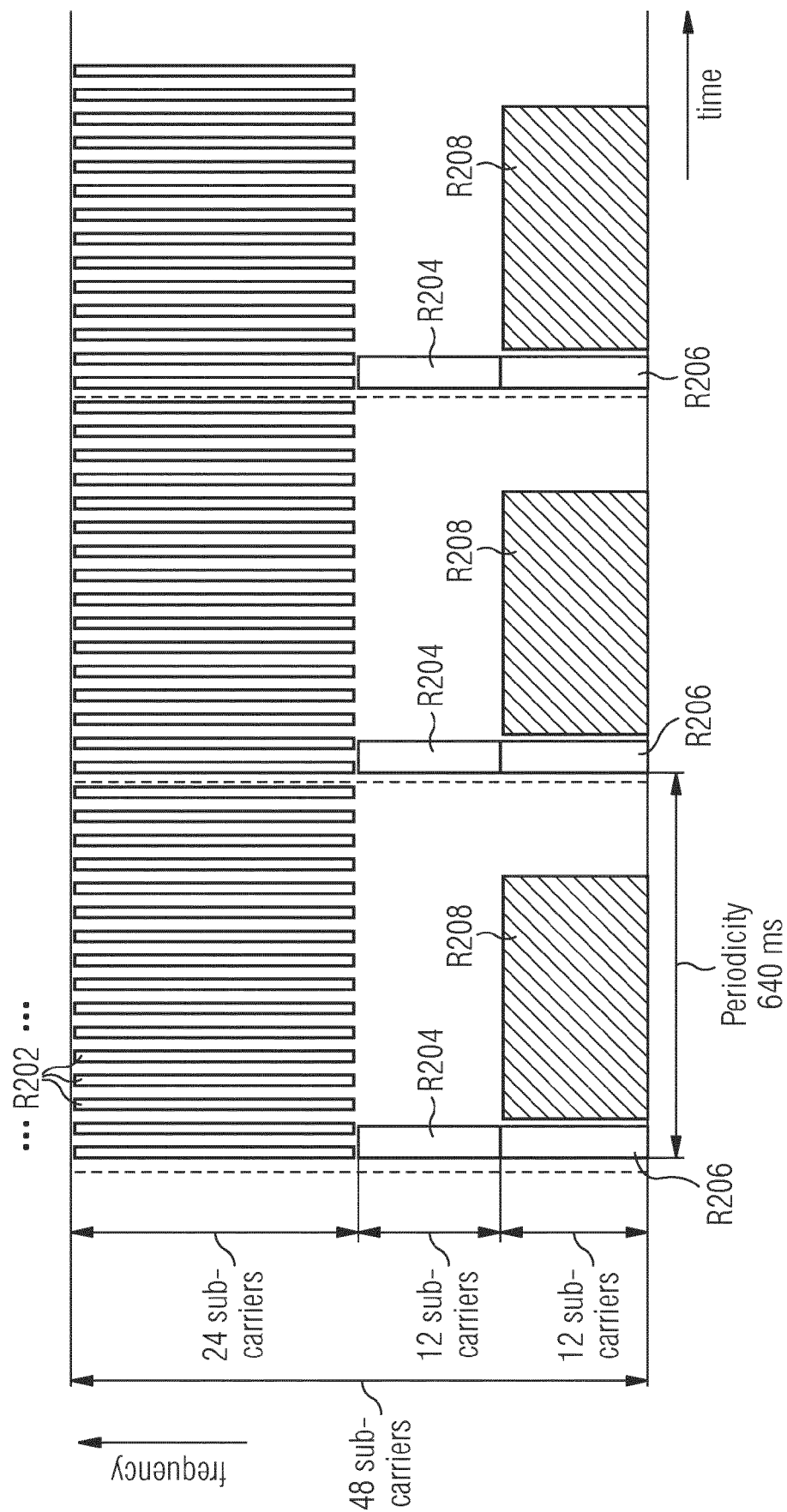
FIG. 2 is a first example of a radio resource diagram, in accordance with certain embodiments.

FIG. 2 thereto illustrates an example of a radio resource grid for NB-IOT comprising 48 sub-carriers. With respect to the time coordinate, a section with roughly 3 transport blocks each having a length of 640 milliseconds (ms) are depicted. The different resources are associated to different CE levels, comprising CE level 0 (CE 0) with 2 repetitions, CE level 1 (CE 1) with 8 repetitions and CE level 2 (CE 2) with 32 repetitions.

Each transport block comprises:
   first resources 202 spanning the 24 sub-carriers in the upper part of the grid, with 2 repetitions (CE 0) and having a periodicity of 40 ms;
   second resources 204 spanning 12 resources of the second quarter of the 48 resources from the bottom with 8 repetitions (CE 1) and having a periodicity of 640 ms;
   third resources 206 spanning 12 resources of the first quarter of the 48 resources from the bottom with 8 repetitions (CE 1) and having a periodicity of 640 ms; and
   fourth resources 208 spanning 12 resources of the first quarter of the 48 resources from the bottom with 32 repetitions (CE 2) and having a periodicity of 640 ms.

By way of example, second resources 204 are assigned to virtual partition.

In an embodiment, the preambles are partitioned in time, so that every Nth reoccurring (N)PRACH resource is used for indicating use (or support) of early data. This embodiment may also be combined with other embodiments discussed above.

Figure 3:
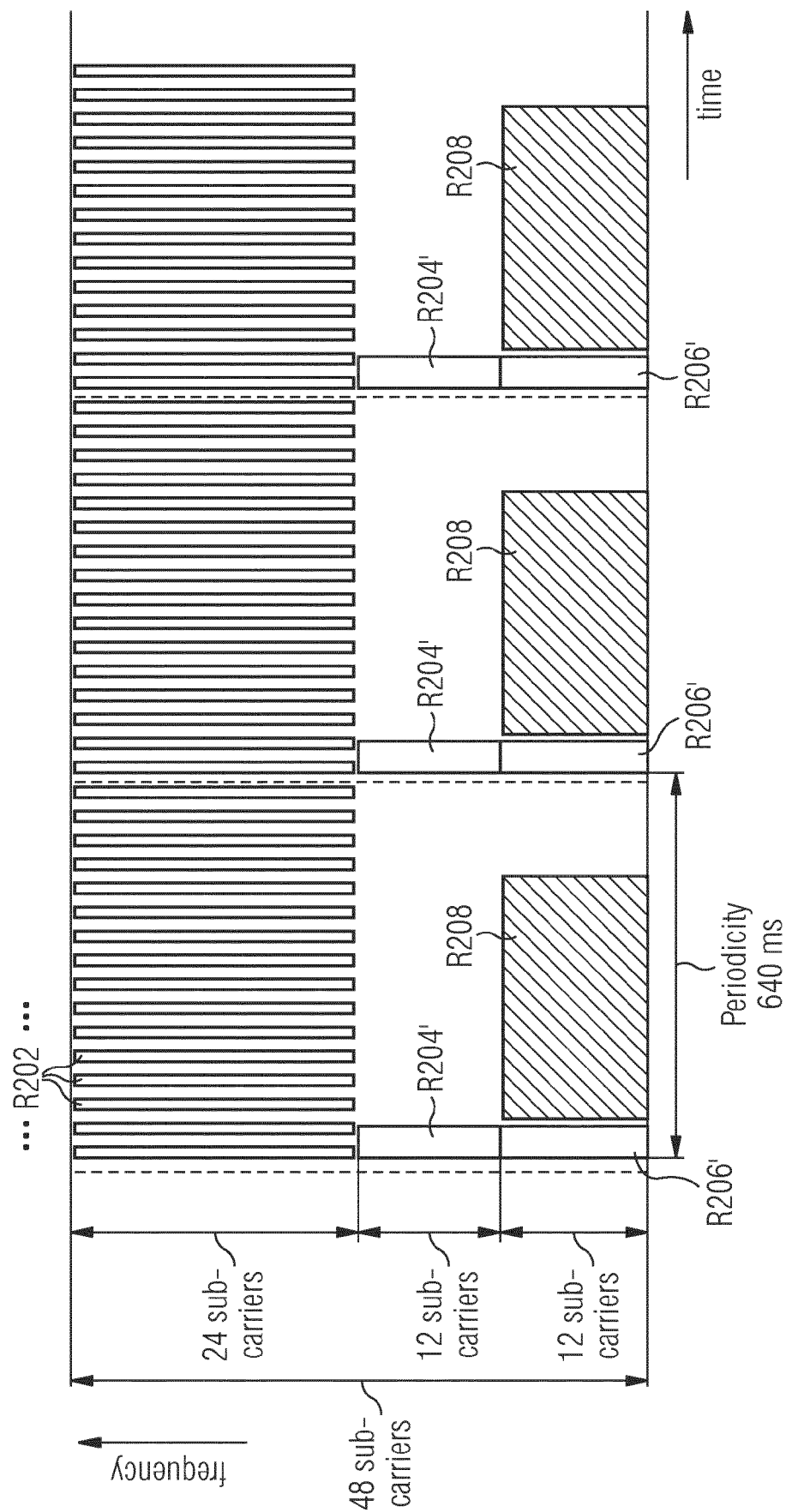
FIG. 3 is a second example of a radio resource diagram, in accordance with certain embodiments.

Thereto, FIG. 3 illustrates an example of a radio resource grid for NB-IOT similar to the example of FIG. 2 with first and fourth resources R202 and R212, but modified second and third resources R204' and R206'. Modified second resources 204' assigned to virtual partition similarly span 12 resources of the second quarter of the 48 resources from the bottom with 8 repetitions (CE 1) but having a periodicity of 1280 ms (thus with every second NPRACH resource being used for virtual partition). Accordingly, the modified fourth resources 208' differ from the fourth resources 208 in that they span 12 sub-carriers every second transport block and 24 sub-carriers every second transport block in between.

In an embodiment, a new non-backwards compatible physical layer definition of the (N)PRACH waveform would be used to carry the indication of use (or support) for early data transmission. An example for NB-IoT is the use of a new preamble channel bandwidth, e.g. 1.25 kHz. Another example is an application of a scrambling sequence modulating the NPRACH symbols, which in Release 13 and 14 are unmodulated.

In an embodiment, specific frequency resources are used for the indication, such as a narrowband or NB-IoT carrier, where the (N)PRACH preambles are sent, which, if used indicates the capability of the early data feature. Thus, in this embodiment, two or more narrow bands may be allocated to be used for the (N)PRACH transmissions. This embodiment can be further combined with previous embodiments.

After receiving at the base station (e.g. eNB) a (N)PRACH preamble sequence corresponding to "early data indication", any of the following actions may be performed:

1. The eNB directly allocating larger uplink grant for Msg3, where the message size may be signaled in SI (for example together with the SI giving the partitioning) or where the message size may be included separately in the specifications for the early data feature.
2. The eNB sending a dual grant in msg2 (random access response).
3. The eNB sending subsequent grants without the UE explicitly asking for more grants after receiving RAR, so that the UE may send additional uplink data immediately after msg3 without waiting for a subsequent eNB response.

The above description is described in terms of NB-IoT, but this is not in any way limiting. In a similar manner, the indication could be realized for LTE MTC (eMTC) or any other radio access technology, RAT.

In general, the virtual partitioning can be regarded as a "soft" capability indication from the UE, that is, at the reception of Msg1 the eNB does not know whether the UE is an 'early data capable' UE (e.g. a Release 15 UE) or not (e.g. a Release 13 UE). If the eNB receives from the UE one of the preambles within the virtual partitioning it is however a larger probability that the UE is an 'early data capable' UE. For example, if there are 48 preambles and 12 are used in the virtual partitioning, there is a 25% chance that a non-early data capable UE will select a virtual partitioning preamble, whereas an early data capable UE will always select a preamble virtual partitioning preamble (if such selection is used by the UE as a capability indication and not only when the UE wants to actually transmit early data).

The eNB will however definitely know the UE capability after providing dual grants to the UE and detecting that the UE actually uses the second grant. This "soft" capability indication is not limited to early data and may be used for other capabilities (indication of a certain UE capability (e.g. capability X)).

Figure 4:
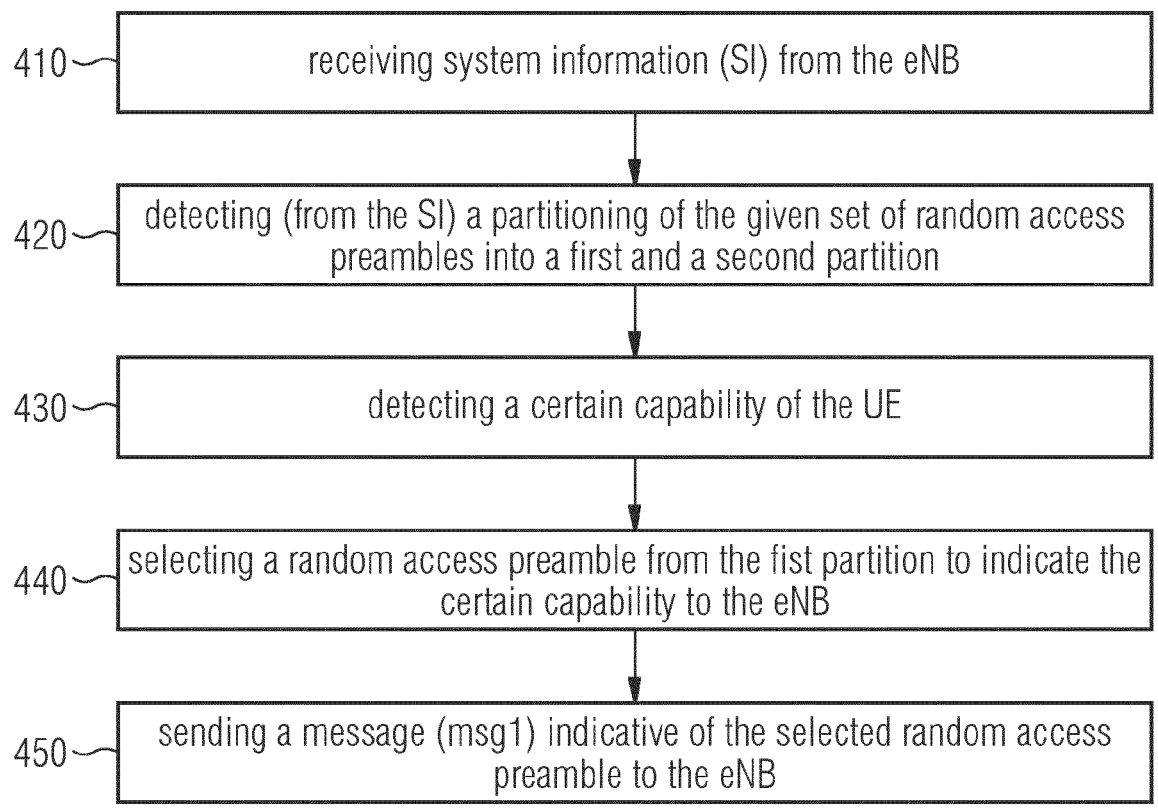
FIG. 4 is a flow chart of an exemplary method performed in a UE, in accordance with certain embodiments.
Figure 5:
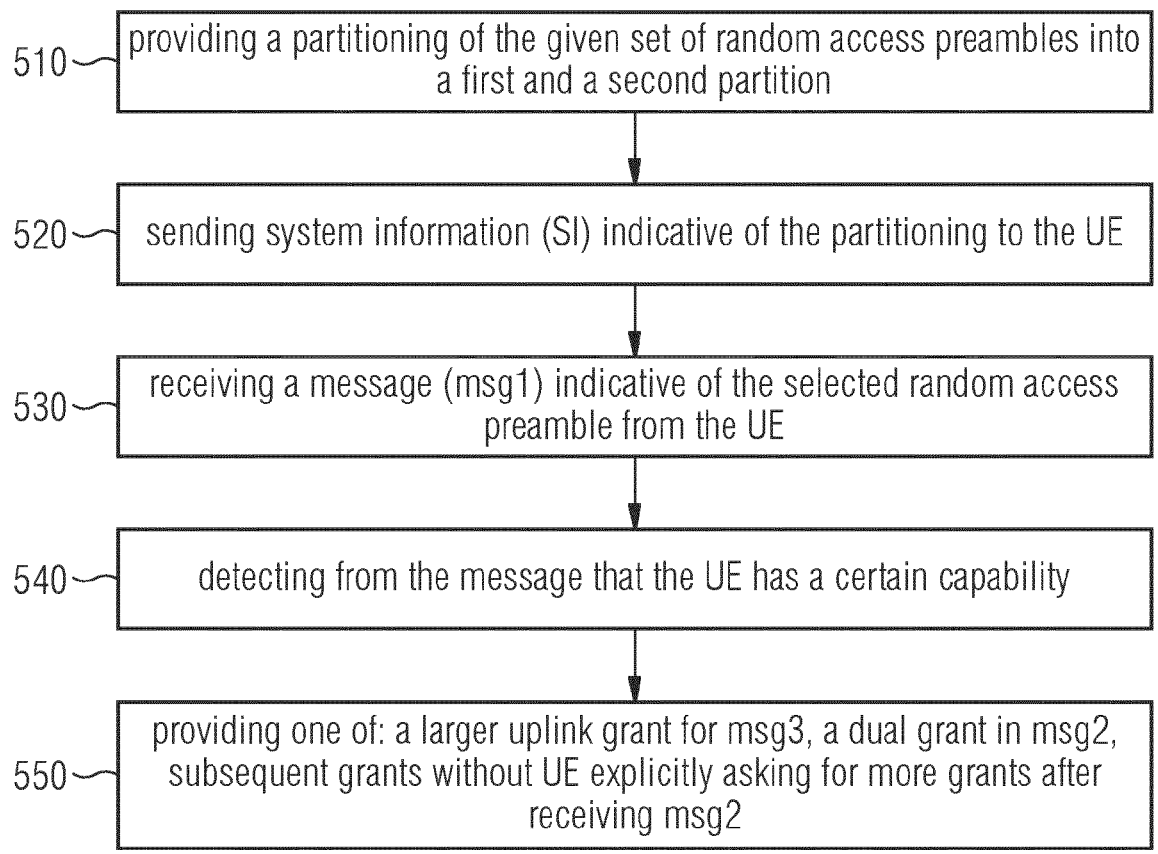
FIG. 5 is a flow chart of an exemplary method performed in an eNB, in accordance with certain embodiments.

FIG. 4 is a flow chart of an exemplary method performed in a UE in accordance with certain embodiments, comprising the following steps:

step 410: receiving system information (SI) from the eNB;
step 420: detecting (from the SI) a partitioning of the given set of random access preambles into a first and a second partition;
step 430: detecting a certain capability of the UE;
step 440: selecting a random access preamble from the fist partition to indicate the certain capability to the eNB; and
step 450: sending a message (msg1) indicative of the selected random access preamble to the eNB FIG. 5 is a flow chart of an exemplary method performed in an eNB in accordance with certain embodiments, comprising the following steps:

step 510: providing a partitioning of the given set of random access preambles into a first and a second partition;
step 520: sending system information (SI) indicative of the partitioning to the UE;
step 530: receiving a message (msg1) indicative of the selected random access preamble from the UE;
step 540: detecting from the message that the UE has a certain capability; and
step 550: providing one of: a larger uplink grant for msg3, a dual grant in msg2, subsequent grants without UE explicitly asking for more grants after receiving msg2.

Figure 6:
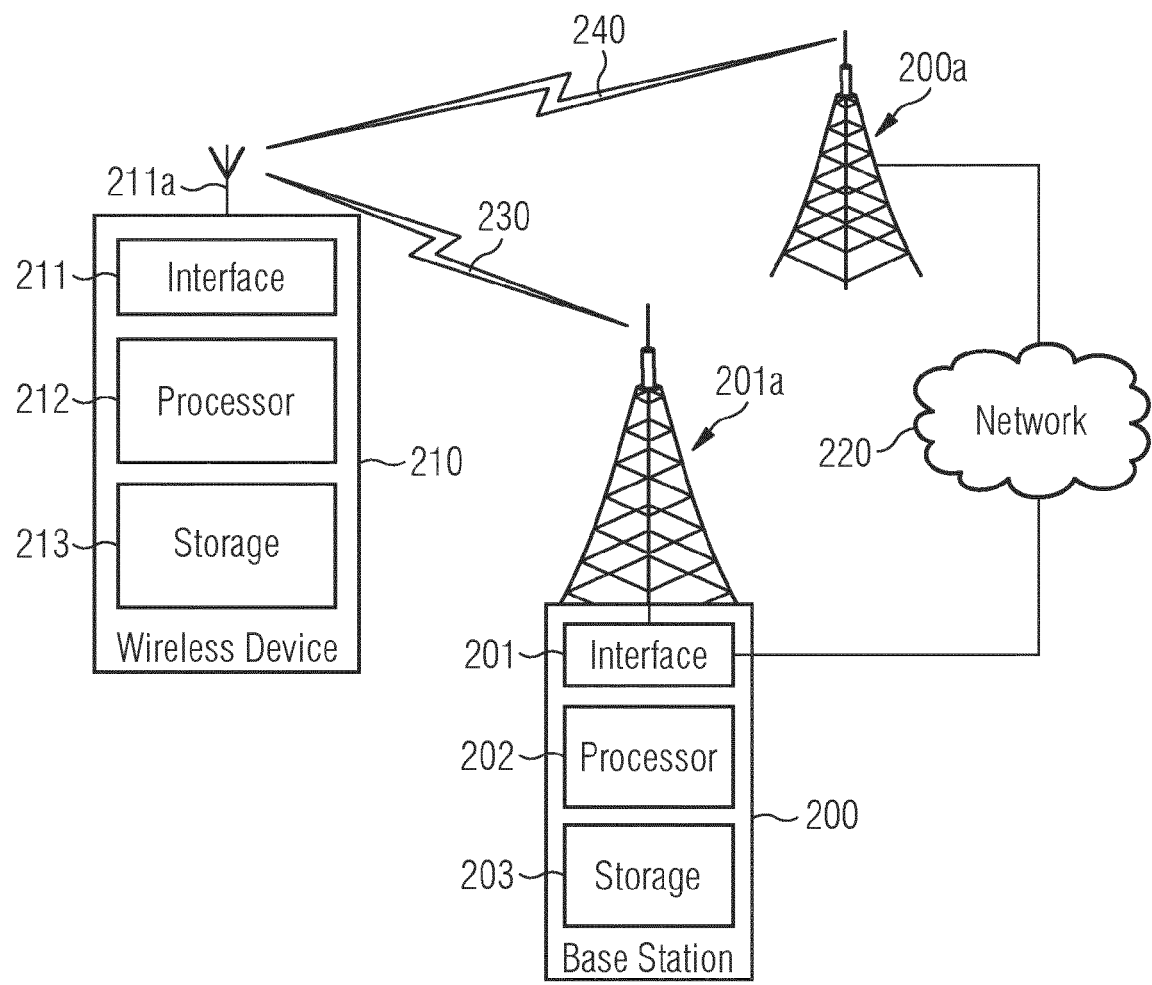
FIG. 6 is a block diagram illustrating an example a radio network comprising an eNB and a wireless device in accordance with certain embodiments.

Although the solutions described above may be implemented in any appropriate type of system using any suitable components, particular embodiments of the described solutions may be implemented in a wireless network such as the example wireless communication network illustrated in FIG. 6. In the example embodiment of FIG. 6, the wireless communication network provides communication and other types of services to one or more wireless devices. In the illustrated embodiment, the wireless communication network includes one or more instances of network nodes that facilitate the wireless devices' access to and/or use of the services provided by the wireless communication network. The wireless communication network may further include any additional elements suitable to support communication between wireless devices or between a wireless device and another communication device, such as a landline telephone.

Network 220 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices.

The wireless communication network may represent any type of communication, telecommunication, data, cellular, and/or radio network or other type of system. In particular embodiments, the wireless communication network may be configured to operate according to specific standards or other types of predefined rules or procedures. Thus, particular embodiments of the wireless communication network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards.

FIG. 6 illustrates a wireless network comprising a more detailed view of network node 200 and wireless device (WD) 210, in accordance with a particular embodiment. For simplicity, FIG. 6 only depicts network 220, network nodes 200 and 200a, and WD 210. Network node 200 comprises processor 202, storage 203, interface 201, and antenna 201a.

Similarly, WD 210 comprises processor 212, storage 213, interface 211 and antenna 211*a*. These components may work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components that may facilitate or participate in the communication of data and/or signals whether via wired or wireless connections.

As used herein, "network node" refers to equipment capable, configured, arranged and/or operable to communicate directly or indirectly with a wireless device and/or with other equipment in the wireless communication network that enable and/or provide wireless access to the wireless device. Examples of network nodes include, but are not limited to, access points (APs), in particular radio access points. A network node may represent base stations (BSs), such as radio base stations. Particular examples of radio base stations include Node Bs, and evolved Node Bs (eNBs). Base stations may be categorized based on the amount of coverage they provide (or, stated differently, their transmit power level) and may then also be referred to as femto base stations, pico base stations, micro base stations, or macro base stations. "Network node" also includes one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base stations may also be referred to as nodes in a distributed antenna system (DAS).

As a particular non-limiting example, a base station may be a relay node or a relay donor node controlling a relay.

Yet further examples of network nodes include multi-standard radio (MSR) radio equipment such as MSR BSs, network controllers such as radio network controllers (RNCs) or base station controllers (BSCs), base transceiver stations (BTSs), transmission points, transmission nodes, Multi-cell/multicast Coordination Entities (MCEs), core network nodes (e.g., MSCs, MMEs), O&M nodes, OSS nodes, SON nodes, positioning nodes (e.g., E-SMLCs), and/or MDTs. More generally, however, network nodes may represent any suitable device (or group of devices) capable, configured, arranged, and/or operable to enable and/or provide a wireless device access to the wireless communication network or to provide some service to a wireless device that has accessed the wireless communication network.

As used herein, the term "radio node" is used generically to refer both to wireless devices and network nodes, as each is respectively described above.

In FIG. 6, Network node 200 comprises processor 202, storage 203, interface 201, and antenna 201*a*. These components are depicted as single boxes located within a single larger box. In practice however, a network node may comprise multiple different physical components that make up a single illustrated component (e.g., interface 201 may comprise terminals for coupling wires for a wired connection and a radio transceiver for a wireless connection). As another example, network node 200 may be a virtual network node in which multiple different physically separate components interact to provide the functionality of network node 200 (e.g., processor 202 may comprise three separate processors located in three separate enclosures, where each processor is responsible for a different function for a particular instance of network node 200). Similarly, network node 200 may be composed of multiple physically separate components (e.g., a NodeB component and a RNC component, a BTS component and a BSC component, etc.), which may each have their own respective processor, storage, and interface components. In certain scenarios in which network node 200 comprises multiple separate components (e.g., BTS and BSC components), one or more of the separate components may be shared among several network nodes. For example, a single RNC may control multiple NodeB's. In such a scenario, each unique NodeB and BSC pair, may be a separate network node. In some embodiments, network node 200 may be configured to support multiple radio access technologies (RATs). In such embodiments, some components may be duplicated (e.g., separate storage 203 for the different RATs) and some components may be reused (e.g., the same antenna 201*a* may be shared by the RATs).

Processor 202 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network node 200 components, such as storage 203, network node 200 functionality. For example, processor 202 may execute instructions stored in storage 203. Such functionality may include providing various wireless features discussed herein to a wireless device, such as WD 210, including any of the features or benefits disclosed herein.

Storage 203 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 203 may store any suitable instructions, data or information, including software and encoded logic, utilized by network node 200. Storage 203 may be used to store any calculations made by processor 202 and/or any data received via interface 201.

Network node 200 also comprises interface 201 which may be used in the wired or wireless communication of signalling and/or data between network node 200, network 220, and/or WD 210. For example, interface 201 may perform any formatting, coding, or translating that may be needed to allow network node 200 to send and receive data from network 220 over a wired connection. Interface 201 may also include a radio transmitter and/or receiver that may be coupled to or a part of antenna 201*a*. The radio may receive digital data that is to be sent out to other network nodes or WDs via a wireless connection. The radio may convert the digital data into a radio signal having the appropriate channel and bandwidth parameters. The radio signal may then be transmitted via antenna 201*a* to the appropriate recipient (e.g., WD 210).

Antenna 201*a* may be any type of antenna capable of transmitting and receiving data and/or signals wirelessly. In some embodiments, antenna 201*a* may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

As used herein, "wireless device" (WD) refers to a device capable, configured, arranged and/or operable to communicate wirelessly with network nodes and/or another wireless device. Communicating wirelessly may involve transmitting and/or receiving wireless signals using electromagnetic signals, radio waves, infrared signals, and/or other types of signals suitable for conveying information through air. In particular embodiments, wireless devices may be configured to transmit and/or receive information without direct human interaction. For instance, a wireless device may be designed to transmit information to a network on a predetermined schedule, when triggered by an internal or external event, or in response to requests from the network. Generally, a wireless device may represent any device capable of, configured for, arranged for, and/or operable for wireless communication, for example radio communication devices. Examples of wireless devices include, but are not limited to, user equipment (UE) such as smart phones. Further examples include wireless cameras, wireless-enabled tablet computers, laptop-embedded equipment (LEE), laptop-mounted equipment (LME), USB dongles, and/or wireless customer-premises equipment (CPE).

As one specific example, a wireless device may represent a UE configured for communication in accordance with one or more communication standards promulgated by the $3^{rd}$ Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. Instead, a UE may represent a device that is intended for sale to, or operation by, a human user but that may not initially be associated with a specific human user.

The wireless device may support device-to-device (D2D) communication, for example by implementing a 3GPP standard for sidelink communication, and may in this case be referred to as a D2D communication device.

As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as a machine-type communication (MTC) device. As one particular example, the wireless device may be a UE implementing the 3GPP narrow band internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a wireless device may represent a vehicle or other equipment that is capable of monitoring and/or reporting on its operational status or other functions associated with its operation.

A wireless device as described above may represent the endpoint of a wireless connection, in which case the device may be referred to as a wireless terminal.

Furthermore, a wireless device as described above may be mobile, in which case it may also be referred to as a mobile device or a mobile terminal.

As depicted in FIG. 6, WD 210 may be any type of wireless endpoint, mobile station, mobile phone, wireless local loop phone, smartphone, user equipment, desktop computer, PDA, cell phone, tablet, laptop, VoIP phone or handset, which is able to wirelessly send and receive data and/or signals to and from a network node, such as network node 200 and/or other WDs. WD 210 comprises processor 212, storage 213, interface 211, and antenna 211a. Like network node 200, the components of WD 210 are depicted as single boxes located within a single larger box, however in practice a wireless device may comprises multiple different physical components that make up a single illustrated component (e.g., storage 213 may comprise multiple discrete microchips, each microchip representing a portion of the total storage capacity).

Processor 212 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other WD 210 components, such as storage 213, WD 210 functionality. Such functionality may include providing various wireless features discussed herein, including any of the features or benefits disclosed herein.

Storage 213 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. Storage 213 may store any suitable data, instructions, or information, including software and encoded logic, utilized by WD 210. Storage 213 may be used to store any calculations made by processor 212 and/or any data received via interface 211.

Interface 211 may be used in the wireless communication of signalling and/or data between WD 210 and network node 200. For example, interface 211 may perform any formatting, coding, or translating that may be needed to allow WD 210 to send and receive data from network node 200 over a wireless connection. Interface 211 may also include a radio transmitter and/or receiver that may be coupled to or a part of antenna 211a. The radio may receive digital data that is to be sent out to network node 201 via a wireless connection. The radio may convert the digital data into a radio signal having the appropriate channel and bandwidth parameters. The radio signal may then be transmitted via antenna 211a to network node 200.

Antenna 211a may be any type of antenna capable of transmitting and receiving data and/or signals wirelessly. In some embodiments, antenna 211a may comprise one or more omni-directional, sector or panel antennas operable to transmit/receive radio signals between 2 GHz and 66 GHz. For simplicity, antenna 211a may be considered a part of interface 211 to the extent that a wireless signal is being used.

Figure 7:
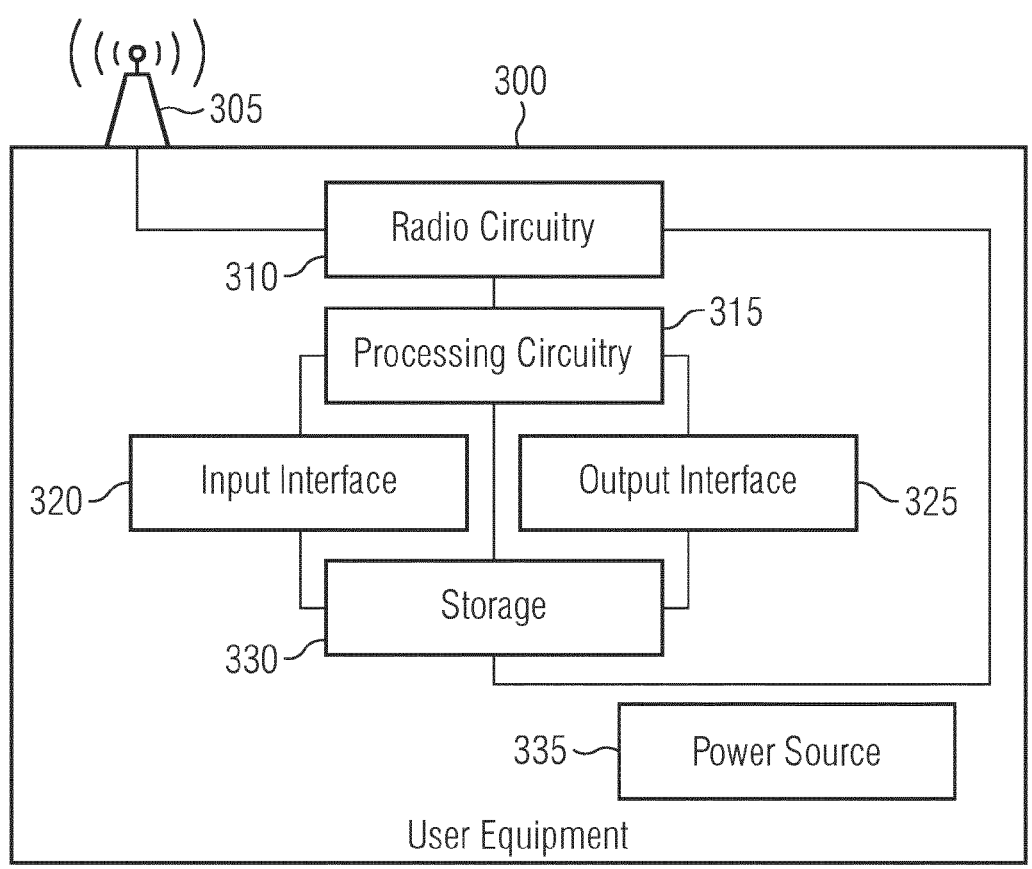
FIG. 7 is a block diagram illustrating an example of a UE, in accordance with certain embodiments.

As shown in FIG. 7, user equipment (UE) 300 is an example wireless device. UE 300 includes an antenna 305, radio front-end circuitry 310, processing circuitry 315, and a computer-readable storage medium 330. Antenna 305 may include one or more antennas or antenna arrays, is configured to send and/or receive wireless signals, and is connected to radio front-end circuitry 310. In certain alternative embodiments, wireless device 300 may not include antenna 305, and antenna 305 may instead be separate from wireless device 300 and be connectable to wireless device 300 through an interface or port.

The radio front-end circuitry 310 may comprise various filters and amplifiers, is connected to antenna 305 and processing circuitry 315, and is configured to condition signals communicated between antenna 305 and processing circuitry 315. In certain alternative embodiments, wireless device 300 may not include radio front-end circuitry 310, and processing circuitry 315 may instead be connected to antenna 305 without radio front-end circuitry 310.

Processing circuitry 315 may include one or more of radio frequency (RF) transceiver circuitry, baseband processing circuitry, and application processing circuitry. In some embodiments, the RF transceiver circuitry, baseband processing circuitry, and application processing circuitry may be on separate chipsets. In alternative embodiments, part or all of the baseband processing circuitry and application processing circuitry may be combined into one chipset, and the RF transceiver circuitry may be on a separate chipset. In still alternative embodiments, part or all of the RF transceiver circuitry and baseband processing circuitry may be on the same chipset, and the application processing circuitry may be on a separate chipset. In yet other alternative embodiments, part or all of the RF transceiver circuitry, baseband processing circuitry, and application processing circuitry may be combined in the same chipset. Processing circuitry 315 may include, for example, one or more central processing units (CPUs), one or more microprocessors, one or more application specific integrated circuits (ASICs), and/or one or more field programmable gate arrays (FPGAs).

In particular embodiments, some or all of the functionality described herein as being provided by a wireless device may be provided by the processing circuitry 315 executing instructions stored on a computer-readable storage medium 330. In alternative embodiments, some or all of the functionality may be provided by the processing circuitry 315 without executing instructions stored on a computer-readable medium, such as in a hard-wired manner. In any of those particular embodiments, whether executing instructions stored on a computer-readable storage medium or not, the processing circuitry can be said to be configured to perform the described functionality. The benefits provided by such functionality are not limited to the processing circuitry 315 alone or to other components of UE 300, but are enjoyed by the wireless device as a whole, and/or by end users and the wireless network generally.

Antenna 305, radio front-end circuitry 310, and/or processing circuitry 315 may be configured to perform any receiving operations described herein as being performed by a wireless device. Any information, data and/or signals may be received from a network node and/or another wireless device.

The processing circuitry 315 may be configured to perform any determining operations described herein as being performed by a wireless device. Determining as performed by processing circuitry 315 may include processing information obtained by the processing circuitry 315 by, for example, converting the obtained information into other information, comparing the obtained information or converted information to information stored in the wireless device, and/or performing one or more operations based on the obtained information or converted information, and as a result of said processing making a determination.

Antenna 305, radio front-end circuitry 310, and/or processing circuitry 315 may be configured to perform any transmitting operations described herein as being performed by a wireless device. Any information, data and/or signals may be transmitted to a network node and/or another wireless device.

Computer-readable storage medium 330 is generally operable to store instructions, such as a computer program, software, an application including one or more of logic, rules, code, tables, etc. and/or other instructions capable of being executed by a processor. Examples of computer-readable storage medium 330 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information, data, and/or instructions that may be used by processing circuitry 315. In some embodiments, processing circuitry 315 and computer-readable storage medium 330 may be considered to be integrated.

Alternative embodiments of UE 300 may include additional components beyond those shown in FIG. 6 that may be responsible for providing certain aspects of the UE's functionality, including any of the functionality described herein and/or any functionality necessary to support the solution described above. As just one example, UE 300 may include input interfaces, devices and circuits, and output interfaces, devices and circuits. Input interfaces, devices, and circuits are configured to allow input of information into UE 300, and are connected to processing circuitry 315 to allow processing circuitry 315 to process the input information. For example, input interfaces, devices, and circuits may include a microphone, a proximity or other sensor, keys/buttons, a touch display, one or more cameras, a USB port, or other input elements. Output interfaces, devices, and circuits are configured to allow output of information from UE 300, and are connected to processing circuitry 315 to allow processing circuitry 315 to output information from UE 300. For example, output interfaces, devices, or circuits may include a speaker, a display, vibrating circuitry, a USB port, a headphone interface, or other output elements. Using one or more input and output interfaces, devices, and circuits, UE 300 may communicate with end users and/or the wireless network, and allow them to benefit from the functionality described herein.

As another example, UE 300 may include power source 335. Power source 335 may comprise power management circuitry. Power source 335 may receive power from a power supply, which may either be comprised in, or be external to, power source 335. For example, UE 300 may comprise a power supply in the form of a battery or battery pack which is connected to, or integrated in, power source 335. Other types of power sources, such as photovoltaic devices, may also be used. As a further example, UE 300 may be connectable to an external power supply (such as an electricity outlet) via an input circuitry or interface such as an electrical cable, whereby the external power supply supplies power to power source 335. Power source 335 may be connected to radio front-end circuitry 310, processing circuitry 315, and/or computer-readable storage medium 330 and be configured to supply UE 300, including processing circuitry 315, with power for performing the functionality described herein.

UE 300 may also include multiple sets of processing circuitry 315, computer-readable storage medium 330, radio circuitry 310, and/or antenna 305 for different wireless technologies integrated into wireless device 300, such as, for example, GSM, WCDMA, LTE, NR, Wi-Fi, or Bluetooth wireless technologies. These wireless technologies may be integrated into the same or different chipsets and other components within wireless device 300.

Any appropriate steps, methods, or functions may be performed through a computer program product that may, for example, be executed by the components and equipment illustrated in one or more of the figures above. For example, storage 203 may comprise computer readable means on which a computer program can be stored. The computer program may include instructions which cause processor 202 (and any operatively coupled entities and devices, such as interface 201 and storage 203) to execute methods according to embodiments described herein. The computer program and/or computer program product may thus provide means for performing any steps herein disclosed.

Any appropriate steps, methods, or functions may be performed through one or more functional modules. Each functional module may comprise software, computer programs, sub-routines, libraries, source code, or any other form of executable instructions that are executed by, for example, a processor. In some embodiments, each functional module may be implemented in hardware and/or in software. For example, one or more or all functional modules may be implemented by processors 212 and/or 202, possibly in cooperation with storage 213 and/or 203. Processors 212 and/or 202 and storage 213 and/or 203 may thus be arranged to allow processors 212 and/or 202 to fetch instructions from storage 213 and/or 203 and execute the fetched instructions to allow the respective functional module to perform any steps or functions disclosed herein.

The example aspects of the disclosure presented below may be included in and/or may add features to one or more embodiments presented in the disclosure above. In some cases, the example aspects of the disclosure presented below form aspects of one or more embodiments that are at least partially distinct from the one or more embodiments presented above.

FIG. 8 schematically illustrates a telecommunication network connected via an intermediate network to a host computer. With reference to FIG. 8, in accordance with an embodiment, a communication system includes a telecommunication network A-10, such as a 3GPP-type cellular network, which comprises an access network A-11, such as a radio access network, and a core network A-14. The access network A-11 comprises a plurality of base stations A-12a, A-12b, A-12c, such as NBs, eNBs, gNBs or other types of wireless access points, each defining a corresponding coverage area A-13a, A-13b, A-13c. In an aspect, any of base stations A-12a, A-12b, A-12c, or any other base stations described herein may be considered to be a network node, for instance, if such as network node is described above in the present Application. Each base station A-12a, A-12b, A-12c is connectable to the core network A-14 over a wired or wireless connection A-15. A first user equipment (UE) A-91 located in coverage area A-13c is configured to wirelessly connect to, or be paged by, the corresponding base station A-12c. A second UE A-92 in coverage area A-13a is wirelessly connectable to the corresponding base station A-12a. While a plurality of UEs A-91, A-92 are illustrated in this example, the disclosed embodiments are equally applicable to a situation where a sole UE is in the coverage area or where a sole UE is connecting to the corresponding base station A-12. In an aspect, any of these UEs, or any other UE described herein may be considered to be configured to perform the aspects of any UE, user terminal, client device, or mobile device described above in the present Application.

The telecommunication network A-10 is itself connected to a host computer A-30, which may be embodied in the hardware and/or software of a standalone server, a cloud-implemented server, a distributed server or as processing resources in a server farm. The host computer A-30 may be under the ownership or control of a service provider, may be operated by the service provider or on behalf of the service provider. The connections A-21, A-22 between the telecommunication network A-10 and the host computer A-30 may extend directly from the core network A-14 to the host computer A-30 or may go via an optional intermediate network A-20. The intermediate network A-20 may be one of, or a combination of more than one of, a public, private or hosted network; the intermediate network A-20, if any, may be a backbone network or the Internet; in particular, the intermediate network A-20 may comprise two or more sub-networks (not shown).

The communication system of FIG. 8 as a whole enables connectivity between one of the connected UEs A-91, A-92 and the host computer A-30. The connectivity may be described as an over-the-top (OTT) connection A-50. The host computer A-30 and the connected UEs A-91, A-92 are configured to communicate data and/or signaling via the OTT connection A-50, using the access network A-11, the core network A-14, any intermediate network A-20 and possible further infrastructure (not shown) as intermediaries. The OTT connection A-50 may be transparent in the sense that the participating communication devices through which the OTT connection A-50 passes are unaware of routing of uplink and downlink communications. For example, a base station A-12 may not or need not be informed about the past routing of an incoming downlink communication with data originating from a host computer A-30 to be forwarded (e.g., handed over) to a connected UE A-91. Similarly, the base station A-12 need not be aware of the future routing of an outgoing uplink communication originating from the UE A-91 towards the host computer A-30.

Example implementations, in accordance with an embodiment, of the UE, base station and host computer discussed in the preceding paragraphs will now be described with reference to FIG. 9. FIG. 9 is a generalized block Diagram of a host computer communicating via a base station with a user equipment over a partially wireless connection.

With reference to FIG. 9, in a communication system B-00, a host computer B-10 comprises hardware B-15 including a communication interface B-16 configured to set up and maintain a wired or wireless connection with an interface of a different communication device of the communication system B-00. The host computer B-10 further comprises processing circuitry B-18, which may have storage and/or processing capabilities. In particular, the processing circuitry B-18 may comprise one or more programmable processors, application-specific integrated circuits, field programmable gate arrays or combinations of these (not shown) adapted to execute instructions. The host computer B-10 further comprises software B-11, which is stored in or accessible by the host computer B-10 and executable by the processing circuitry B-18. The software B-11 includes a host application B-12. The host application B-12 may be operable to provide a service to a remote user, such as a UE B-30 connecting via an OTT connection B-50 terminating at the UE B-30 and the host computer B-10. In providing the service to the remote user, the host application B-12 may provide user data which is transmitted using the OTT connection B-50.

The communication system B-00 further includes a base station B-20 provided in a telecommunication system and comprising hardware B-25 enabling it to communicate with the host computer B-10 and with the UE B-30. The hardware B-25 may include a communication interface B-26 for setting up and maintaining a wired or wireless connection with an interface of a different communication device of the communication system B-00, as well as a radio interface B-27 for setting up and maintaining at least a wireless connection B-70 with a UE B-30 located in a coverage area (not shown in FIG. 9) served by the base station B-20.

The communication interface B-26 may be configured to facilitate a connection B-60 to the host computer B-10. The connection B-60 may be direct or it may pass through a core network (not shown in FIG. 9) of the telecommunication system and/or through one or more intermediate networks outside the telecommunication system. In the embodiment shown, the hardware B-25 of the base station B-20 further includes processing circuitry B-28, which may comprise one or more programmable processors, application-specific integrated circuits, field programmable gate arrays or combinations of these (not shown) adapted to execute instructions. The base station B-20 further has software B-21 stored internally or accessible via an external connection.

The communication system B-00 further includes the UE B-30, which has already been referred to above. Its hardware B-35 may include a radio interface B-37 configured to set up and maintain a wireless connection B-70 with a base station serving a coverage area in which the UE B-30 is currently located. The hardware B-35 of the UE B-30 further includes processing circuitry B-38, which may comprise one or more programmable processors, application-specific integrated circuits, field programmable gate arrays or combinations of these (not shown) adapted to execute instructions. The UE B-30 further comprises software B-31, which is stored in or accessible by the UE B-30 and executable by the processing circuitry B-38.

The software B-31 includes a client application B-32. The client application B-32 may be operable to provide a service to a human or non-human user via the UE B-30, with the support of the host computer B-10. In the host computer B-10, an executing host application B-12 may communicate with the executing client application B-32 via the OTT connection B-50 terminating at the UE B-30 and the host computer B-10. In providing the service to the user, the client application B-32 may receive request data from the host application B-12 and provide user data in response to the request data. The OTT connection B-50 may transfer both the request data and the user data. The client application B-32 may interact with the user to generate the user data that it provides.

It is noted that the host computer B-10, base station B-20 and UE B-30 illustrated in FIG. 9 may be identical to the host computer A-30, one of the base stations A-12a, A-12b, A-12c and one of the UEs A-91, A-92 of FIG. 8, respectively. This is to say, the inner workings of these entities may be as shown in FIG. 9 and independently, the surrounding network topology may be that of FIG. 8.

In FIG. 9, the OTT connection B-50 has been drawn abstractly to illustrate the communication between the host computer B-10 and the use equipment B-30 via the base station B-20, without explicit reference to any intermediary devices and the precise routing of messages via these devices. Network infrastructure may determine the routing, which it may be configured to hide from the UE B-30 or from the service provider operating the host computer B-10, or both. While the OTT connection B-50 is active, the network infrastructure may further take decisions by which it dynamically changes the routing (e.g., on the basis of load balancing consideration or reconfiguration of the network).

The wireless connection B-70 between the UE B-30 and the base station B-20 is in accordance with the teachings of the embodiments described throughout this disclosure. One or more of the various embodiments improve the performance of OTT services provided to the UE B-30 using the OTT connection B-50, in which the wireless connection B-70 forms the last segment. More precisely, the teachings of these embodiments can improve one or more of data rate, latency, and/or power consumption associated with one or more devices and/or communications of/performed in communication system B-00, and thereby can provide benefits for OTT user data communication, such as one or more of reduced user waiting time, relaxed restriction on file size, better responsiveness, and/or extended battery lifetime.

A measurement procedure may be provided for the purpose of monitoring data rate, latency and other factors on which the one or more embodiments improve. There may further be an optional network functionality for reconfiguring the OTT connection B-50 between the host computer B-10 and UE B-30, in response to variations in the measurement results. The measurement procedure and/or the network functionality for reconfiguring the OTT connection B-50 may be implemented in the software B-11 of the host computer B-10 or in the software B-31 of the UE B-30, or both.

In embodiments, sensors (not shown) may be deployed in or in association with communication devices through which the OTT connection B-50 passes; the sensors may participate in the measurement procedure by supplying values of the monitored quantities exemplified above, or supplying values of other physical quantities from which software B-11, B-31 may compute or estimate the monitored quantities. The reconfiguring of the OTT connection B-50 may include message format, retransmission settings, preferred routing etc.; the reconfiguring need not affect the base station B-20, and it may be unknown or imperceptible to the base station B-20.

Such procedures and functionalities may be known and practiced in the art. In certain embodiments, measurements may involve proprietary UE signaling facilitating the host computer's B-10 measurements of throughput, propagation times, latency and the like. The measurements may be implemented in that the software B-11, B-31 causes messages to be transmitted, in particular empty or 'dummy' messages, using the OTT connection B-50 while it monitors propagation times, errors etc.

FIGS. 10, 11, 12, and 13 are flowcharts illustrating methods implemented in a communication system including a host computer, a base station and a user equipment.

Figure 10:
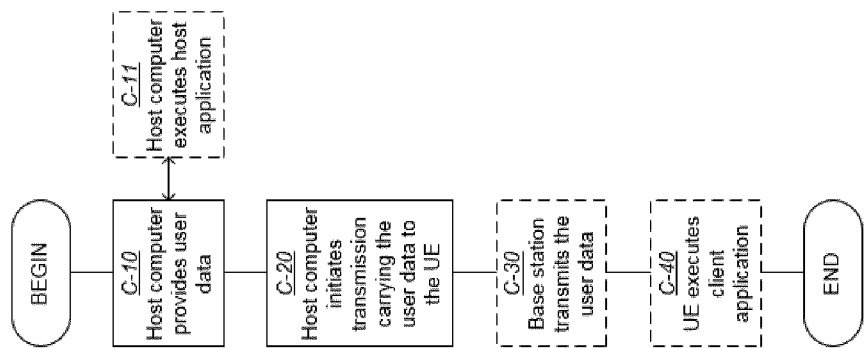

FIG. 10 is a flowchart illustrating a method implemented in a communication system, in accordance with one embodiment.

The communication system includes a host computer, a base station and a UE which may be those described with reference to FIGS. 8 and 9. For simplicity of the present disclosure, only drawing references to FIG. 10 will be included in this section. In a first step C-10 of the method, the host computer provides user data.

In an optional substep C-11 of the first step C-10, the host computer provides the user data by executing a host application. In a second step C-20, the host computer initiates a transmission carrying the user data to the UE.

In an optional third step C-30, the base station transmits to the UE the user data which was carried in the transmission that the host computer initiated, in accordance with the teachings of the embodiments described throughout this disclosure. In an optional fourth step C-40, the UE executes a client application associated with the host application executed by the host computer.

Figure 11:
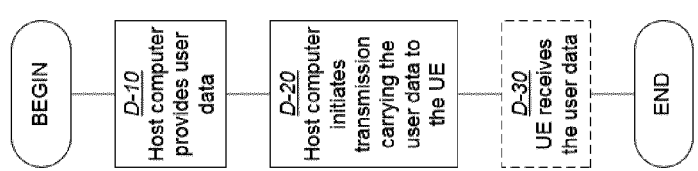

FIG. 11 is a flowchart illustrating a method implemented in a communication system, in accordance with one embodiment.

The communication system includes a host computer, a base station and a UE which may be those described with reference to FIGS. 8 and 9. For simplicity of the present disclosure, only drawing references to FIG. 11 will be included in this section. In a first step D-10 of the method, the host computer provides user data.

In an optional substep (not shown) the host computer provides the user data by executing a host application. In a second step D-20, the host computer initiates a transmission carrying the user data to the UE. The transmission may pass via the base station, in accordance with the teachings of the embodiments described throughout this disclosure. In an optional third step D-30, the UE receives the user data carried in the transmission.

Figure 12:
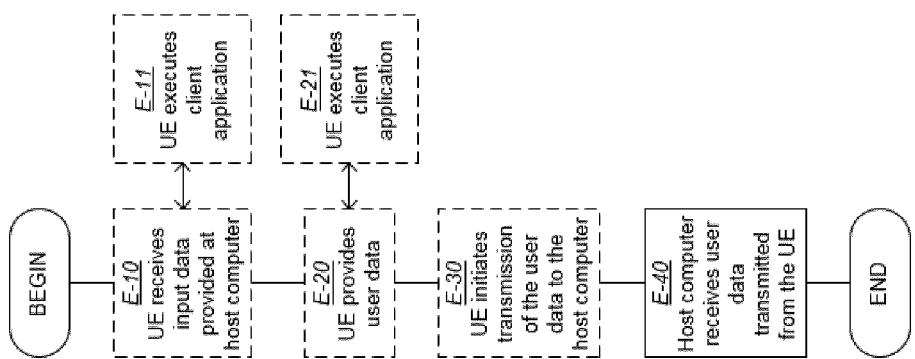

FIG. 12 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 12 will be included in this section. In an optional first step E-10 of the method, the UE receives input data provided by the host computer. Additionally or alternatively, in an optional second step E-20, the UE provides user data. In an optional substep E-21 of the second step E-20, the UE provides the user data by executing a client application. In a further optional substep E-11 of the first step E-10, the UE executes a client application which provides the user data in reaction to the received input data provided by the host computer. In providing the user data, the executed client application may further consider user input received from the user. Regardless of the specific manner in which the user data was provided, the UE initiates, in an optional third substep E-30, transmission of the user data to the host computer. In a fourth step E-40 of the method, the host computer receives the user data transmitted from the UE, in accordance with the teachings of the embodiments described throughout this disclosure.

Figure 13:
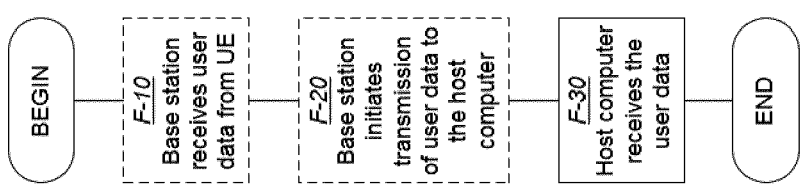

FIG. 13 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 13 will be included in this section. In an optional first step F-10 of the method, in accordance with the teachings of the embodiments described throughout this disclosure, the base station receives user data from the UE. In an optional second step F-20, the base station initiates transmission of the received user data to the host computer. In a third step F-30, the host computer receives the user data carried in the transmission initiated by the base station.

Further exemplary embodiments are listed in the following:

A-1. A base station configured to communicate with a user equipment (UE), the base station comprising a radio interface and processing circuitry configured to perform aspects of example embodiments described throughout the present disclosure.

A-2. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform aspects of example embodiments described throughout the present disclosure, including aspects related to forwarding the user data to the UE.

A-3. The communication system of embodiment A-2, further including the base station.

A-4. The communication system of embodiment A-3, further including the UE, wherein the UE is configured to communicate with the base station.

A-5. The communication system of embodiment A-4, wherein:
the processing circuitry of the host computer is configured to execute a host application, thereby providing the user data; and
the UE comprises processing circuitry configured to execute a client application associated with the host application.

A-6. A method implemented in a base station, comprising aspects of example embodiments described throughout the present disclosure, including aspects related to transmitting user data to a UE.

A-7. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station is configured to perform aspects of example embodiments described throughout the present disclosure, included aspects related to transmitting the user data to the UE.

A-8. The method of embodiment A-7, further comprising:
at the base station, transmitting the user data.

A-9. The method of embodiment A-8, wherein the user data is provided at the host computer by executing a host application, the method further comprising:
at the UE, executing a client application associated with the host application.

A-10. A user equipment (UE) configured to communicate with a base station, the UE comprising a radio interface and processing circuitry configured to perform aspects of example embodiments described throughout the present disclosure, including aspects related to receiving user data from the base station.

A-11. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's processing circuitry configured to perform aspects of example embodiments described throughout the present disclosure, including aspects related to the UE receiving the user data from the base station.

A-12. The communication system of embodiment A-11, further including the UE.

A-13. The communication system of embodiment A-12, wherein the cellular network further includes a base station configured to communicate with the UE.

A-14. The communication system of embodiment A-12 or A-13, wherein:
the processing circuitry of the host computer is configured to execute a host application, thereby providing the user data; and the UE's processing circuitry is configured to execute a client application associated with the host application.

A-15. A method implemented in a user equipment (UE), comprising aspects of example embodiments described throughout the present disclosure, including aspects related to the UE receiving user data from a base station.

A-16. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE is configured to perform aspects of example embodiments described throughout the present disclosure, including aspects related to the UE receiving the user data from the base station.

A-17. The method of embodiment A-16, further comprising:
at the UE, receiving the user data from the base station.

A-18. A user equipment (UE) configured to communicate with a base station, the UE comprising a radio interface and processing circuitry configured to perform aspects of example embodiments described throughout the present disclosure, including aspects related to the UE transmitting user data to the base station.

A-19. A communication system including a host computer comprising:
a communication interface configured to receive user data originating from a transmission from a user equipment (UE) to a base station,
wherein the UE comprises a radio interface and processing circuitry, the UE's processing circuitry configured to perform aspects of example embodiments described throughout the present disclosure, including aspects related to the UE transmitting user data to the base station.

A-20. The communication system of embodiment A-19, further including the UE.

A-21. The communication system of embodiment A-20, further including the base station, wherein the base station comprises a radio interface configured to communicate with the UE and a communication interface configured to forward to the host computer the user data carried by a transmission from the UE to the base station.

A-22. The communication system of embodiment A-20 or A-21, wherein:
the processing circuitry of the host computer is configured to execute a host application; and
the UE's processing circuitry is configured to execute a client application associated with the host application, thereby providing the user data.

A-23. The communication system of embodiment A-20 or A-21, wherein:
the processing circuitry of the host computer is configured to execute a host application, thereby providing request data; and
the UE's processing circuitry is configured to execute a client application associated with the host application, thereby providing the user data in response to the request data.

A-24. A method implemented in a user equipment (UE), comprising aspects of example embodiments described throughout the present disclosure, including aspects related to the UE transmitting user data to a base station.

A-25. The method of embodiment A-24, further comprising:
providing user data; and
forwarding the user data to a host computer via the transmission to the base station.

A-26. A method implemented in a communication system including a host computer, a base station and a user equipment (UE), the method comprising:
at the host computer, receiving user data transmitted to the base station from the UE, wherein the UE is configured to perform aspects of example embodiments described throughout the present disclosure, including aspects related to the UE transmitting user data to the base station.

A-27. The method of embodiment A-26, further comprising:
at the UE, providing the user data to the base station.

A-28. The method of embodiment A-27, further comprising:
at the UE, executing a client application, thereby providing the user data to be transmitted; and
at the host computer, executing a host application associated with the client application.

A-29. The method of embodiment A-27, further comprising:
at the UE, executing a client application; and
at the UE, receiving input data to the client application, the input data being provided at the host computer by executing a host application associated with the client application,
wherein the user data to be transmitted is provided by the client application in response to the input data.

A-30. A base station configured to communicate with a user equipment (UE), the base station comprising a radio interface and processing circuitry configured to perform aspects of example embodiments described throughout the present disclosure, including aspects related to the base station receiving user data from the UE.

A-31. A communication system including a host computer comprising a communication interface configured to receive user data originating from a transmission from a user equipment (UE) to a base station, wherein the base station comprises a radio interface and processing circuitry, the base station's processing circuitry configured to perform aspects of example embodiments described throughout the present disclosure, including aspects related to the base station receiving user data from the UE.

A-32. The communication system of embodiment A-31, further including the base station.

A-33. The communication system of embodiment A-32, further including the UE, wherein the UE is configured to communicate with the base station.

A-34. The communication system of embodiment A-33, wherein:
the processing circuitry of the host computer is configured to execute a host application;
the UE is configured to execute a client application associated with the host application, thereby providing the user data to be received by the host computer.

A-35. A method implemented in a base station, comprising perform aspects of example embodiments described throughout the present disclosure, including aspects related to the base station receiving user data from a user equipment (UE).

A-36. A method implemented in a communication system including a host computer, a base station and a user equipment (UE), the method comprising:
at the host computer, receiving, from the base station, user data originating from a transmission which the base station has received from the UE, wherein one or both of the base station and the UE are configured to perform aspects of example embodiments described throughout the present disclosure, including aspects related to the base station receiving user data from the UE and/or aspects related to the UE transmitting user data to the base station.

A-37. The method of embodiment A-36, further comprising:
at the base station, receiving the user data from the UE.

A-38. The method of embodiment A-37, further comprising:
at the base station, initiating a transmission of the received user data to the host computer.

ABBREVIATIONS USED IN THE PRESENT DISCLOSURE

| Abbreviation | Explanation |
| --- | --- |
| 3GPP | 3rd Generation Partnership Project |
| BI | Backoff Indicator |
| BSR | Buffer Status Report |
| Cat-M1 | Category M1 |
| Cat-M2 | Category M2 |
| CE | Coverage Enhanced/Enhancement |
| DL | Downlink |
| eMTC | enhanced Machine-Type Communications |
| eNB | Evolved NodeB |
| IoT | Internet of Things |
| LTE | Long-Term Evolution |
| MAC | Medium Access Control |
| NAS | Non-Access Stratum |
| NB-IoT | Narrowband Internet of Things |
| M2M | Machine-to-Machine |
| Msg2 | Message 2 |
| Msg3 | Message 3 |
| MTC | Machine-Typ Communications |
| PDU | Protocol Data Unit |
| (N)PRACH | (Narrowband) Physical Random Access Channel |
| PRB | Physical Resource Block |
| RA | Random Access |
| RAPID | Random Access Preamble IDentifier |
| RAR | Random Access Response |
| RNTI | Radio Network Temporary Identifier |
| RRC | Radio Resource Control (protocol) |
| SI | System Information |
| TBS | Transport Block Size |
| UE | User Equipment |
| UL | Uplink |
| WI | Work Item |

The invention claimed is:

1. A method at a user equipment (UE) for performing a random access procedure with a base station, the method comprising the UE:
detecting a partitioning of the given set of random access preambles into a first and a second partition, the first partition comprising virtual partitioning preambles for non-exclusive use of the UEs with a virtual partitioning capability, and the second partition is for UEs without the virtual partitioning capability;
detecting a virtual partitioning capability of the UE, the virtual partitioning capability being an early data transmission capability to transmit or receive data before a radio resource control (RRC) connection setup or resume has been completed and the virtual partitioning capability being a capability related to the UE supporting preamble partitioning such that the UE selects a preamble out of the first partition from the given set of random access preambles; and
in response to detecting the virtual partitioning capability, selecting a random access preamble from the first partition to indicate the virtual partitioning capability to the base station.

2. The method of claim 1, further comprising:
receiving system information from the base station; and detecting the partitioning from the system information.

3. The method of claim 2, wherein the system information comprises an information element indicative of the partitioning of a random access preamble space.

4. The method of claim 3, wherein the information element is an information element comprised by a Physical Random Access Channel (PRACH) configuration or a Narrowband PRACH (NPRACH) configuration.

5. The method of claim 1, further comprising sending a message indicative of the selected random access preamble to the base station.

6. The method of claim 5, wherein the UE, receives a random access response in response to sending the message indicative of the selected random access preamble.

7. The method of claim 6, wherein the random access response comprises a dual grant of the selected random access preamble in the random access response.

8. The method of claim 6, wherein the random access response comprises a larger uplink grant than that granted to UEs that do not have the virtual partitioning capability.

9. The method of claim 6, wherein the UE receives a plurality of subsequent grants without explicitly requesting such grants.

10. A user equipment (UE) configured to communicate with a base station for performing a random access procedure with a base station, the UE expected, if the UE does not have a virtual partitioning capability, to randomly select a random access preamble from a given set of preambles to be used for the random access procedure the UE comprising:
processing circuitry;
memory containing instructions executable by the processing circuitry whereby the UE is operative to:
detect a partitioning of the given set of random access preambles into a first and a second partition, the first partition comprising virtual partitioning preambles;
detect a virtual partitioning capability of the UE, the virtual partitioning capability being a capability to transmit or receive data before a radio resource control (RRC) connection setup or resume has been completed and the virtual partitioning capability being a capability related to the UE supporting preamble partitioning such that the UE selects a preamble out of the first partition from the given set of random access preambles; and
in response to detecting the virtual partitioning capability, select a random access preamble from the first partition to indicate the virtual partitioning capability to the base station.

11. A method at a base station for performing a random access procedure, the method comprising the base station:
providing, to a User Equipment (UE), an indication of a partitioning of the given set of random access preambles into a first and a second partition, the first partition comprising virtual partitioning preambles, thereby expecting that the UE, if the UE has a virtual partitioning capability, selects a random access preamble from the first partition, and otherwise that the UE randomly selects a random access preamble from the given set of preambles, the virtual partitioning capability being a capability to transmit or receive data before a radio resource control (RRC) connection setup or resume has been completed and the virtual partitioning capability being a capability related to the UE supporting preamble partitioning such that the UE selects a preamble out of the first partition from the given set of random access preambles;

receiving, from the UE, a message indicative of a selected random access preamble; and assuming the virtual partitioning capability of the UE by detecting that the selected random access preamble is comprised by the first partition although the base station does not know whether the UE has the virtual partitioning capability or not.

12. The method of claim 11, further comprising sending system information comprising the indication of the partitioning.

13. The method of claim 11, wherein the system information comprises an information element indicative of the partitioning of a random access preamble space.

14. The method of claim 13, wherein the information element is an information element comprised by a Physical Random Access Channel (PRACH) configuration or a Narrowband PRACH (NPRACH) configuration.

15. The method of claim 11, wherein the virtual partitioning capability is a capability to transmit or receive data before a radio resource control (RRC) connection setup or resume has been completed.

16. The method of claim 15, wherein the base station sends a random access response in response to receiving the message indicative of the selected random access preamble.

17. The method of claim 16, wherein the random access response comprises a dual grant of the selected random access preamble in the random access response.

18. The method of claim 16, wherein the random access response comprises a larger uplink grant than that granted to UEs that do not have the virtual partitioning capability.

19. A base station, comprising:
processing circuitry;
memory containing instructions executable by the processing circuitry whereby the base station is operative to:
provide, to a User Equipment (UE), an indication of a partitioning of the given set of random access preambles into a first and a second partition, the first partition comprising virtual partitioning preambles, thereby expecting that the UE, if the UE has a virtual partitioning capability, selects a random access preamble from the first partition, and otherwise that the UE randomly selects a random access preamble from the given set of preambles, the virtual partitioning capability being a capability to transmit or receive data before a radio resource control (RRC) connection setup or resume has been completed and the virtual partitioning capability being a capability related to the UE supporting preamble partitioning such that the UE selects a preamble out of the first partition from the given set of random access preambles;
receive, from the UE, a message indicative of a selected random access preamble; and
assume the virtual partitioning capability of the UE by detecting that the selected random access preamble is comprised by the first partition although the base station does not know whether the UE has the virtual partitioning capability or not.

\* \* \* \* \*